Patented Dec. 13, 1927.

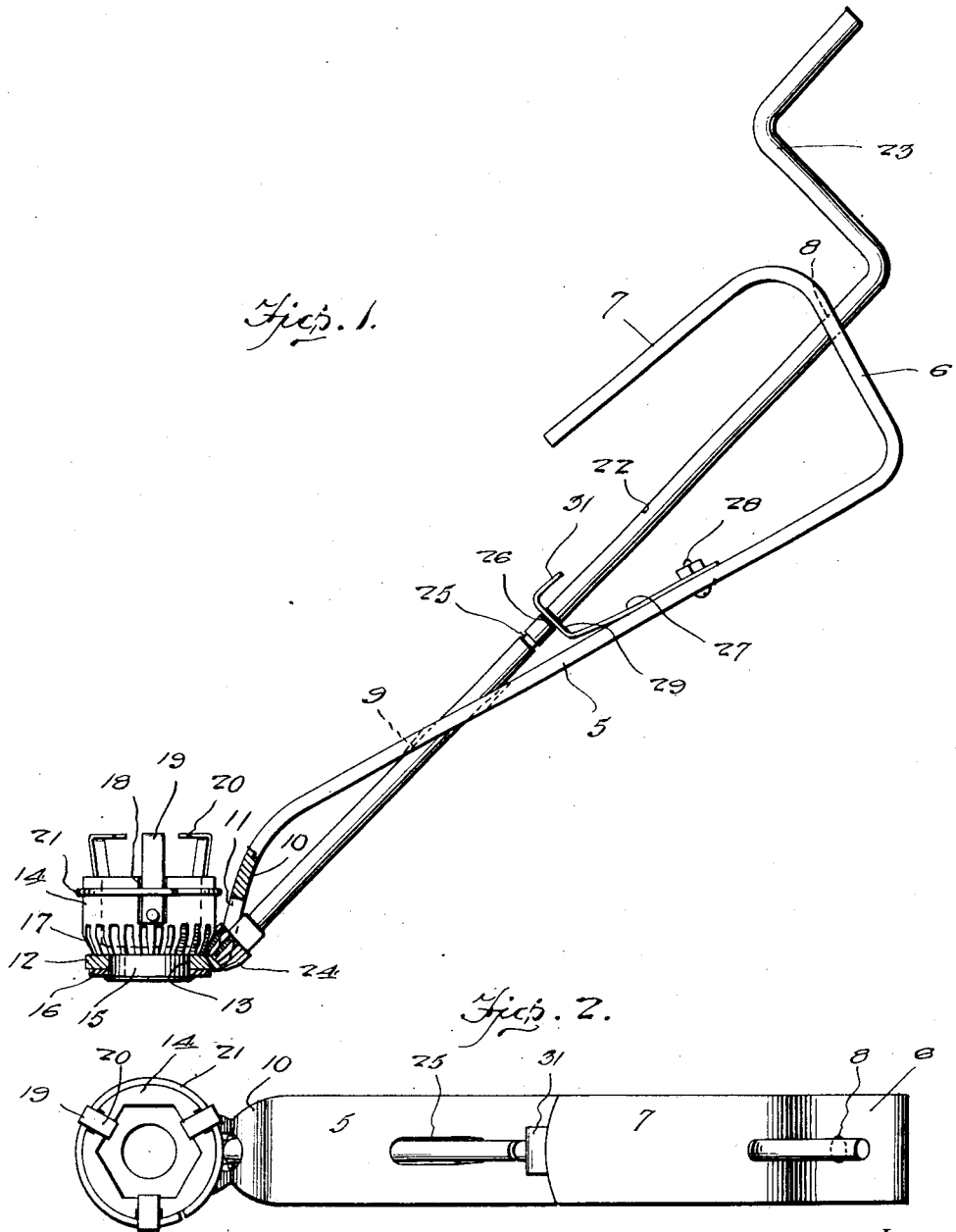

1,652,681

UNITED STATES PATENT OFFICE.

HERBERT OLIVER PETERSON, OF ELKADER, IOWA.

TOOL.

Application filed January 26, 1927. Serial No. 163,728.

The present invention relates to an improved tool which is primarily designed for the removal and replacing of lock washers and adjusting nuts used in conjunction with the transmission bands of Ford automobiles of the model of 1925 and later and the principal object of the invention resides in the provision of a more handy and efficient structure than that disclosed in my allowed application, Serial No. 79,796, filed Jan. 7, 1926, and the present application is an improvement of said allowed application.

The removal and installation of transmission bands is a tedious job because of the likelihood of dropping the adjusting nut or lock washer in the transmission casing. When the washer or nut or both are dropped into the transmission casing, considerable additional labor is required in order to remove the same therefrom. The present tool eliminates any likelihood of accidentally dropping the lock washer or adjusting nut during the removal or installation of the transmission band.

With the above and numerous other objects in view as will appear as the description proceeds, the invention resides in certain novel features of construction, and in the combination and arrangement of parts as will be hereinafter more fully described and claimed.

In the drawing:

Figure 1 is a sectional elevation of the tool embodying the features of my invention, Fig. 2 is a plan view thereof, Fig. 3 is a detail perspective view of a spring member used in conjunction therewith.

Referring to the drawing in detail, it will be seen that the numeral 5 denotes an elongated straight shank which merges at one end into a right angular extension 6 which in turn merges into an oblique extension 7 disposed over the shank 5 at an acute angle thereto. An intermediate portion of the extension 6 is provided with an opening 8. An intermediate portion of the shank 5 adjacent the other end is provided with an elongated slot 9. Said other end of the shank 5 merges into an oblique extension 10, the extremity of which is provided with an elongated slot 11 and merges into a plate 12 having a circular opening 13. The plate 12 extends at an obtuse angle to the extension 10 and at a larger obtuse angle to the shank 5.

A socket head 14 is formed with a reduced extension 15 journaled in the opening 13 of the plate 12 and held against accidental displacement by a ring 16. The exterior of the socket head 14 adjacent the reduced extension 15 is beveled and formed with gear teeth 17. A plurality of recesses 18 are formed in the exterior of the socket head 14 adjacent the other end and have anchored therein spring jaws 19 having angular extensions 20. A ring 21 is slidable over the head 14 for engaging the jaws 19 to bend them in towards each other so as to hold a notch in the socket head against accidental displacement therefrom.

A shaft 22 is journaled and slidably mounted in the opening 8 and the slot 9 and at one end is provided with a crank 23 and at the other end has mounted thereon a pinion 24 of the beveled type for meshing with the beveled gear teeth 17, the pinion 24 being located in the slot 11. The shaft 22 is provided intermediate its ends with a pair of spaced annular grooves 25 and 26. A spring 27 is anchored as at 28 to an intermediate portion of the shank 5 and has an angular extension 29 formed with an opening 30 the edge of which is adapted to engage one of the grooves 25 or 26. When the edge of the opening 30 is engaged with the groove 26 it will be seen that the pinion 24 is meshed with the gear teeth 17. However, if the spring 27 is actuated by the lip 31 to disengage the edge of its openings 30 with the groove 26, the shaft 22 may be moved to unmesh the pinion 24 from the teeth 17 and may be held in this position by engaging the edge of the opening 30 with the groove 25. In this latter position the head 14 may be easily engaged with the notch in disassembling the transmission bands and then the pinion may be made to mesh with the teeth 17 in an obvious manner so that by turning the crank 23 the notch may be loosened or tightened. In loosening the nut after the same has become entirely disengaged, there is no likelihood of its ever being lost because of the engagement of the nut with the jaws 19. In the installation of the band the nut may be engaged with the socket head and therefore there will be no likelihood of dropping the nut during this operation.

It is thought that the construction, operation, utility, and advantages of this invention will now be quite apparent without a more detailed description thereof. The present embodiment of the invention has been disclosed in detail since in actual practice it attains the features of advantage enumerated as desirable in the statement of the invention and the above description. It is apparent that changes in the details of construction, and in the combination and arrangement of parts may be resorted to without departing from the spirit or scope of the invention as hereinafter claimed or sacrificing any of its advantages.

Having thus described my invention, what I claim as new is:—

1. A device of the class described comprising an elongated shank, a shaft slidably and rotatably mounted in the shank, said shaft being provided with a pair of spaced annular grooves, a spring engageable with said grooves to hold the shaft in different positions, a socket rotatably mounted in the shank, gearing between the socket and the shaft, said gearing being engaged when the spring is engaged with one groove and disengaged when the spring is engaged with the other groove.

2. A device of the class described comprising an elongated shank, a shaft slidably and rotatably mounted in the shank, one end of the shank being provided with an offset extension having a slot and merging into an angularly disposed plate having a circular opening, a socket head having a reduced circular extension rotatable in the circular opening and provided with an annular series of gear teeth, a pinion mounted on one end of the shaft and meshable with the gear teeth.

3. A device of the class described comprising an elongated shank, a shaft slidably and rotatably mounted in the shank, one end of the shank being provided with an offset extension having a slot and merging into an angularly disposed plate having a circular opening, a socket head having a reduced circular extension rotatable in the circular opening and provided with an annular series of gear teeth, a pinion mounted on one end of the shaft and meshable with the gear teeth, said shaft being provided with a pair of spaced annular grooves, a spring mounted on the shank engageable with said grooves.

In testimony whereof I affix my signature.

HERBERT OLIVER PETERSON.